United States Patent
Arunyaangkul et al.

(10) Patent No.: US 11,119,792 B2
(45) Date of Patent: Sep. 14, 2021

(54) SYSTEMS AND METHODS FOR GENERATING USER INTERFACE PROTOTYPES BASED ON PRODUCTION SYSTEM COMPONENTS

(71) Applicant: Facebook, Inc., Menlo Park, CA (US)

(72) Inventors: Phannipha Arunyaangkul, Seattle, WA (US); Ian Thomas Andrew Obermiller, Seattle, WA (US); Rowland Lee Brown, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 146 days.

(21) Appl. No.: 15/391,683

(22) Filed: Dec. 27, 2016

(65) Prior Publication Data
US 2018/0181413 A1     Jun. 28, 2018

(51) Int. Cl.
*G06F 8/38*     (2018.01)
*G06F 9/451*     (2018.01)

(52) U.S. Cl.
CPC ............... *G06F 9/451* (2018.02); *G06F 8/38* (2013.01)

(58) Field of Classification Search
CPC .... G06F 3/0481; G06F 3/04847; G06F 9/451; G06F 8/34; G06F 8/38
See application file for complete search history.

(56) References Cited

U.S. PATENT DOCUMENTS

| | | | | |
|---|---|---|---|---|
| 6,483,508 B1* | 11/2002 | Ishikawa | ................. | G06T 19/20 345/420 |
| 6,826,727 B1* | 11/2004 | Mohr | .................... | G06F 17/211 382/180 |
| 2013/0036401 A1* | 2/2013 | Lininger | ................. | G06F 3/048 717/109 |
| 2014/0250392 A1* | 9/2014 | Riggins | .............. | H04N 21/8545 715/764 |
| 2014/0297516 A1* | 10/2014 | Brown | ................ | G06F 3/04817 705/39 |

* cited by examiner

*Primary Examiner* — Rinna Yi
(74) *Attorney, Agent, or Firm* — Sheppard Mullin Richter & Hampton LLP

(57) ABSTRACT

Systems, methods, and non-transitory computer readable media can obtain a user interface (UI) component of a production system, wherein the UI component is associated with one or more properties. Each of the one or more properties can be mapped to a graphical user interface (GUI) element for display in a user interface of a design application. A value of a property of the one or more properties can be set based on user input from a GUI element associated with the property. A rendering of the UI component can presented in the user interface based on the set value of the property.

16 Claims, 9 Drawing Sheets

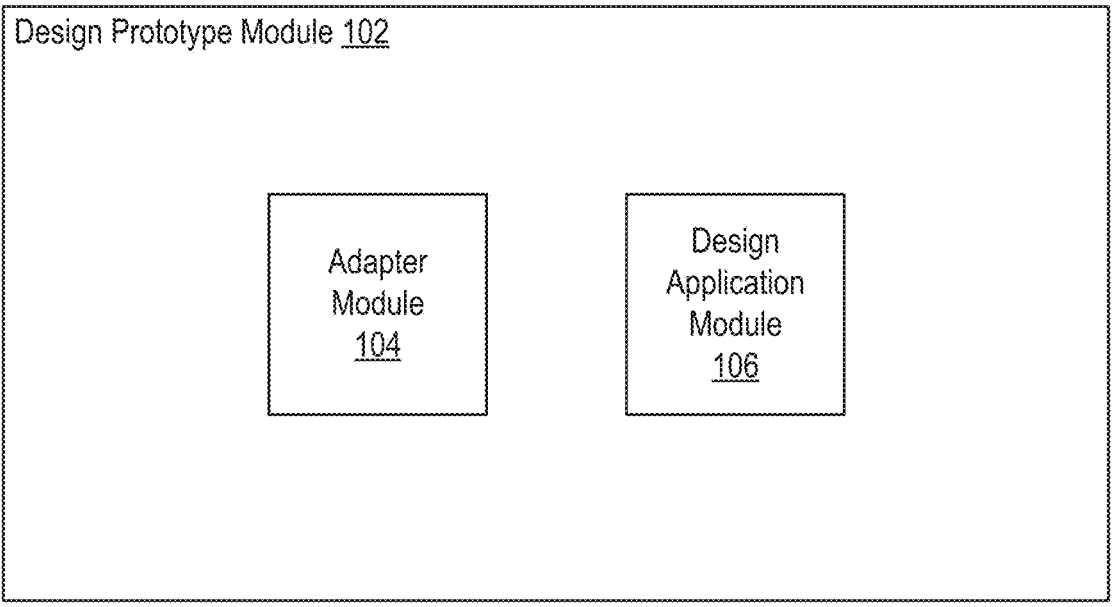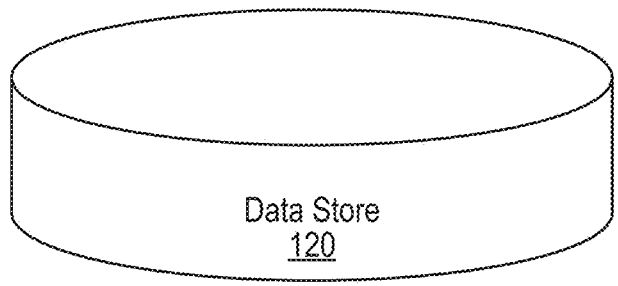
FIGURE 1

400

Obtain a UI component of a production system, wherein the UI component is associated with one or more properties
402

Map each of the one or more properties to a graphical user interface (GUI) element for display in a user interface of a design application
404

Set a value of a property of the one or more properties based on user input from a GUI element associated with the property
406

Present a rendering of the UI component in the user interface based on the set value of the property
408

FIGURE 4

SYSTEMS AND METHODS FOR GENERATING USER INTERFACE PROTOTYPES BASED ON PRODUCTION SYSTEM COMPONENTS

FIELD OF THE INVENTION

The present technology relates to user interface design applications. More particularly, the present technology relates to techniques for utilizing user interface components used in production systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can post, share, and access various content items, such as status updates, images, videos, articles, and links, via the social networking system.

A social networking system may provide various types of user interfaces. For example, the social networking system can provide user profiles through which users may add connections or publish content items. The social networking system can also provide feeds associated with users, such as newsfeeds. The social networking system may also provide pages associated with entities.

SUMMARY

Various embodiments of the present disclosure can include systems, methods, and non-transitory computer readable media configured to obtain a user interface (UI) component of a production system, wherein the UI component is associated with one or more properties. Each of the one or more properties can be mapped to a graphical user interface (GUI) element for display in a user interface of a design application. A value of a property of the one or more properties can be set based on user input from a GUI element associated with the property. A rendering of the UI component can presented in the user interface based on the set value of the property.

In some embodiments, the rendering of the UI component is obtained from the production system.

In certain embodiments, the design application is based on the production system.

In an embodiment, the UI component includes one or more of: a button, a table, a chart, a text field, a text box, a selector, or a navigation bar.

In some embodiments, the GUI element includes one or more of: a text field, a text box, or a selector.

In certain embodiments, the user input can be converted to one or more data structures.

In an embodiment, a first property of the UI component can be associated with a second property of the UI component.

In some embodiments, one or more of: a page, an image, or data can be specified for an action associated with the UI component.

In certain embodiments, an interactive prototype including the UI component can be generated.

In an embodiment, the design application includes a design mode and a preview mode, and the interactive prototype is provided in the preview mode.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including an example design prototype module configured to generate user interface prototypes based on user interface components of a production system, according to an embodiment of the present disclosure.

FIG. 4 illustrates an example first method for generating user interface prototypes based on user interface components of a production system, according to an embodiment of the present disclosure.

Figure 2A:
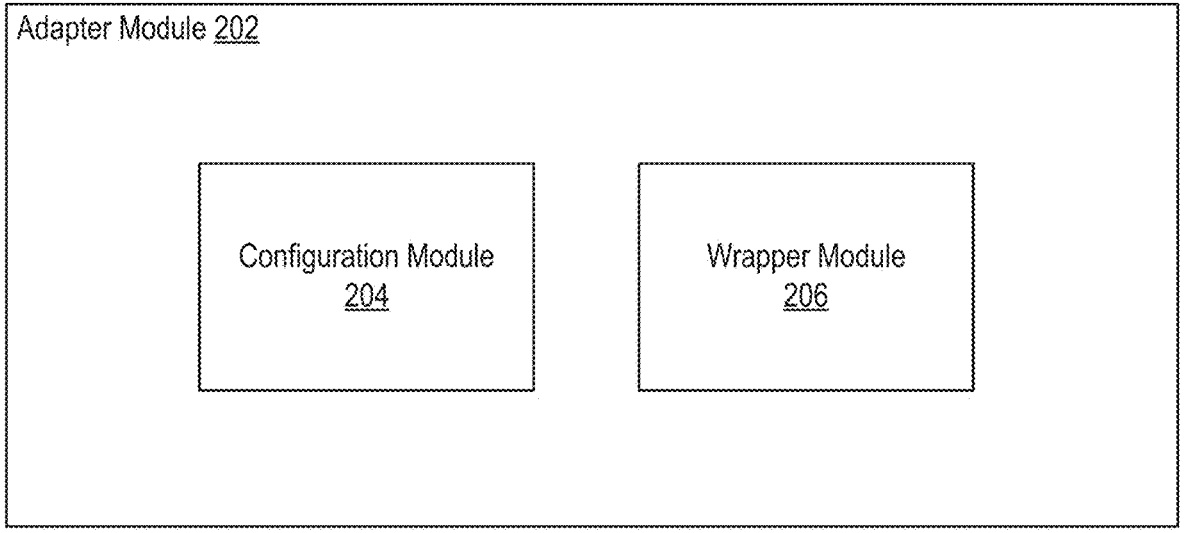
FIG. 2A illustrates an example adapter module configured to adapt user interface components of a production system for use in a design application, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Generating User Interface Prototypes Based on Production System Components

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide various types of user interfaces. For example, the social networking system can provide user profiles through which users may add connections or publish content items. The social networking system can also provide feeds associated with users, such as newsfeeds. The social networking system may also provide pages associated with entities.

Developers, such as developers associated with a social networking system, can create user interfaces (UIs) using tools and UI components provided by a production system. In the process of developing applications and/or systems, designers may create prototypes or mock-ups of user interfaces, for example, using design applications or tools. Conventional approaches specifically arising in the realm of computer technology can create UI components for design applications that correspond to UI components provided by the production system. For example, a design application can provide design application versions of UI components provided by the production system. Under conventional approaches, design application versions of UI components need to be updated continuously based on UI components of the production system. For example, new design application versions need to be created when new UI components are created in the production system, and design application versions need to be updated if there are any changes to UI components in the production system. Accordingly, under conventional approaches, it can be difficult to keep UI components of the production system and design applications of UI components in sync. In addition, conventional approaches may not be able to utilize UI components in the production system directly within design applications.

An improved approach rooted in computer technology can overcome the foregoing and other disadvantages associated with conventional approaches specifically arising in the realm of computer technology. Based on computer technology, the disclosed technology can provide a design application or tool that can utilize UI components provided by a production system. A UI component provided by the production system can have one or more properties associated with it. In the production system, developers can set values of properties of a UI component using code. In the design application, properties of a UI component can be configured in a user interface of the design application. For example, the design application can include a canvas and a properties pane for setting properties of a UI component. The disclosed technology can use an adapter to specify how properties of a UI component should be presented within the user interface of the design application, for example, in the properties pane. For instance, the adapter can map properties of a UI component to graphical user interface (GUI) elements to appear in the properties pane. As an example, a UI component can be a table and can have properties such as a width and an action on selection (e.g., by a click, a touch gesture, etc.). The width property can be mapped to a text field, and the action on selection property can be mapped to a selector. When a table is created in the canvas of the design application, the text field for the width property and the selector for the action on selection property can be provided in the properties pane. A user can enter values for the width property and the action on selection property using the text field and the selector, respectively. The width property and the action on selection property can be set to the values entered by the user. In this way, values of properties of a UI component can be set in the design application, and the UI component can be rendered by the production system based on the set values. For example, the production system and the design application can be based on the same platform or system (e.g., web infrastructure), and accordingly, the production system can render the UI component. In some cases, data for a UI component needs to be formatted in a particular manner (e.g., using data structures), and the disclosed technology can format the data appropriately so that the data can be passed to the UI component. The design application can have two modes: a design mode and a preview mode. A user can create a UI prototype using UI components in the design mode, and an interactive UI prototype can be provided in the preview mode. In some embodiments, links to specific pages, images, and/or data can be specified for actions associated with UI components. In this manner, the disclosed technology can leverage UI components used in the production system in creating prototypes in the design application. Designers can easily set and edit properties of a UI component in the user interface of the design application without using code. UI components can have the same or similar behavior in the design application as in the production system, and a user can create more realistic and interactive prototypes. In addition, design application versions of UI components do not need to be separately created for the design application.

FIG. 1 illustrates an example system 100 including an example design prototype module 102 configured to generate user interface prototypes based on user interface components of a production system, according to an embodiment of the present disclosure. The design prototype module 102 can include an adapter module 104 and a design application module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the design prototype module 102 can be implemented in any suitable combinations. For illustrative purposes, the disclosed technology is described in connection with a social networking system, but the disclosed technology can apply to any type of application and/or system. The disclosed technology can apply to generating any type of user interface, including user interface prototypes.

The adapter module 104 can adapt UI components of a production system for use in a design application. The adapter module 104 can map properties of a UI component of the production system to GUI elements to display within a user interface of the design application. The adapter module 104 can also convert data for a UI component of the production system to a format that is compatible with the UI component. Functionality of the adapter module 104 is described in more detail herein.

The design application module 106 can create UI prototypes based on UI components of a production system. The design application module 106 can provide a design mode and a preview mode for the design application. In the design mode, a user can design a user interface prototype using UI components provided by the production system. In the preview mode, a preview of a designed user interface prototype can be provided. Functionality of the design application module 106 is described in more detail herein.

In some embodiments, the design prototype module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the design prototype module 102 can be, in part or in whole, implemented as software running on one or more computing devices or systems, such as on a server system or a client computing device. In some instances, the design prototype module 102 can be, in part or in whole, implemented within or configured to operate in conjunction or be integrated with a social networking system (or service), such as a social networking system 630 of FIG. 6. Likewise, in some instances, the design prototype module 102 can be, in part or in whole, implemented within or configured to operate in conjunction or be integrated with a client computing device, such as the user device 610 of FIG. 6. For example, the design prototype module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the design prototype module 102. The data maintained by the data store 120 can include, for example, information relating to UI components of a production system, adapters, design applications, design mode, preview mode, GUI elements, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the design prototype module 102 can be configured to communicate and/or operate with the data store 120. In some embodiments, the data store 120 can be a data store within a client computing device. In some embodiments, the data store 120 can be a data store of a server system in communication with the client computing device.

FIG. 2A illustrates an example adapter module 202 configured to adapt user interface components of a production system for use in a design application, according to an embodiment of the present disclosure. In some embodiments, the adapter module 104 of FIG. 1 can be implemented with the example adapter module 202. As shown in the example of FIG. 2A, the example adapter module 202 can include a configuration module 204 and a wrapper module 206.

A production system can provide various UI components for generating user interfaces. A UI component of a production system can have one or more properties. Properties can have valid values or ranges of values associated with them. Properties can have default values. A developer can specify values for properties of a UI component in code, and the production system can render the UI component based on the specified values of properties. Examples of UI components of a production system can include a button, a text field, a text box, a table, a chart, a selector, a navigation bar, etc. In some embodiments, the production system can be based on a web infrastructure.

The configuration module 204 can map properties of a UI component of a production system to GUI elements to display within a user interface of a design application. In the design application, users can configure properties of a UI component via the user interface of the design application. Properties of a UI component can be represented by corresponding GUI elements in the user interface of the design application. Examples of GUI elements can include a text field, a text box, a selector, etc. The configuration module 204 can determine GUI elements to represent properties of a UI component and specify a mapping between the properties and the corresponding GUI elements. The corresponding GUI elements can be displayed within the user interface of the design application. For example, the design application can provide a properties pane for setting properties of a UI component in the user interface, and the GUI elements can be displayed in the properties pane. When a user adds a UI component to a canvas of the design application, GUI elements for properties of the UI can be displayed in the properties pane, for example, with any default values or current values. A user can set or edit a property of the UI component by entering or selecting a value for a GUI element that corresponds to the property. User input for a GUI element can be a text, a number, a selection (e.g., from available values), etc. As an example, a table UI component can have the following properties among others: an identifier, a top position, a left position, data, and an action on selection. The identifier property, the top position property, and the left position property can each be mapped to a text field GUI element. Values for these three properties can be input as texts or numbers as appropriate. The data property can be mapped to a text box GUI element. A value for the data property can be input as a text. The action on selection property can be mapped to a selector or a drop down menu with a number of available options. A value of the action on selection property can be input by selecting a value from available values. Values of the properties of the table UI component can be set based on user input for the above GUI elements. All examples herein are provided for illustrative purposes, and there can be many variations and other possibilities.

The wrapper module 206 can convert data for a UI component of a production system to a format that is compatible with the UI component. In some cases, a UI component may require values for properties to be in a particular format. For example, a table UI component may require data for the table to be provided using a data structure. In order to provide flexibility for user input in the design application, the wrapper module 206 can convert user input for a GUI element for a property from one format to another format. For example, user input for a GUI element can be text, and the text can be parsed and converted to structured data compatible with a UI component (e.g., one or more data structures). In the example of the table UI component above, the GUI element for the data property can accept text in the form of comma separated values (CSV) or tab separated values (TSV) as user input, and the wrapper module 206 can convert the text to a data structure that includes values for the table. In some embodiments, the wrapper module 206 can act as a layer between the configuration module 204 and the production system. The configuration module 204 can map properties of a UI component to corresponding GUI elements, and the wrapper module 206 can perform further processing such that user input from the GUI elements is compatible with the UI component.

The wrapper module 206 can also specify information or logic associated with a UI component of a production system. For example, a UI component that includes a text box can have a first property for specifying a value of the text box and a second property for code that should be executed when the value of the text box is changed. The UI component may not function unless the first property and the second property are linked. In such case, the wrapper module 206 can link the first property and the second property so that when the value of the text box changes, the value of the text box can be passed back to the UI component.

Figure 2B:
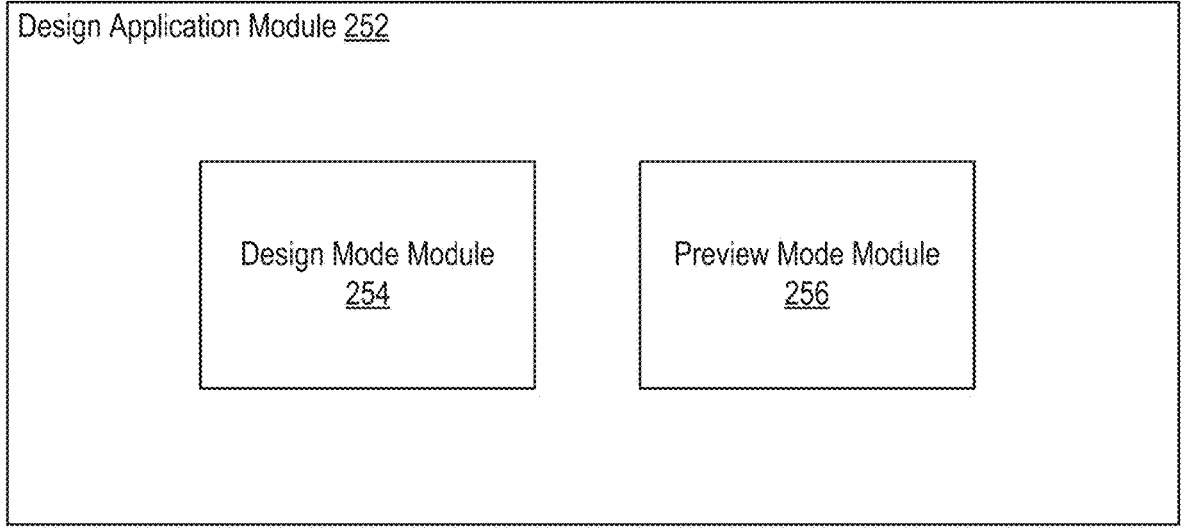
FIG. 2B illustrates an example design application module configured to generate user interface prototypes based on user interface components of a production system, according to an embodiment of the present disclosure.

FIG. 2B illustrates an example design application module 252 configured to generate user interface prototypes based on user interface components of a production system, according to an embodiment of the present disclosure. In some embodiments, the design application module 106 of FIG. 1 can be implemented with the example design application module 252. As shown in the example of FIG. 2B, the example design application module 252 can include a design mode module 254 and a preview mode module 256.

As described above, a design application can have a design mode and a preview mode. In the design mode, a user can design a user interface prototype using UI components provided by a production system. In the preview mode, a preview of a designed user interface prototype can be provided. Since the design application uses the same UI components as the production system, UI components in the design application can be rendered by the production system. For example, the production system can render UI components in the design application based on values of properties as configured in the design application.

The design mode module 254 can provide a design mode of a design application. The design mode can provide a visual tool with which a user can create a UI prototype using various UI components of a production system. The visual tool can include a canvas, one or more toolbars, one or more panes for displaying information (e.g., a properties pane), etc. For example, available UI components can be displayed in a toolbar, and the user can drag and drop a selected UI component to the canvas. The user can modify the UI component by making changes to the UI component in the canvas or by editing properties of the UI component in the properties pane.

The preview mode module 256 can provide a preview mode of a design application. The preview mode module 256 can generate a preview of a designed user interface prototype. The preview of the designed user interface prototype can be functional and interactive since UI components are UI components actually used in the production system. For example, UI components in the preview mode can accept input, perform an action in response to a selection, etc. UI components can have the same behavior as in the production system. For example, a user can hover over a button, and a button style or effect for a hover state of the button can be displayed.

A user can specify behavior of UI components during the preview mode. For instance, behavior of UI components during the preview mode can be specified in the design mode. As an example, a user can specify a page, an image, and/or data to be provided for an action associated with a UI component in the preview mode. For a UI prototype, not all pages or functionalities may be implemented, but it can be helpful to provide examples of such pages or functionalities. Accordingly, a user can specify a page, an image, and/or data that can be displayed for an action associated with a UI component. For example, if a button is selected, an associated action could be to display a results page. If the results page is not actually implemented, a user can specify a mock-up screenshot to be displayed. In another example, if a table is displayed and a portion of the table is selected, a user can specify sample data to display that includes further details about the selected portion. A user can also specify other types of information to be displayed in connection with an action of a UI component. In this way, the design application can provide a complex interactive design flow in UI prototypes.

Figure 3A:
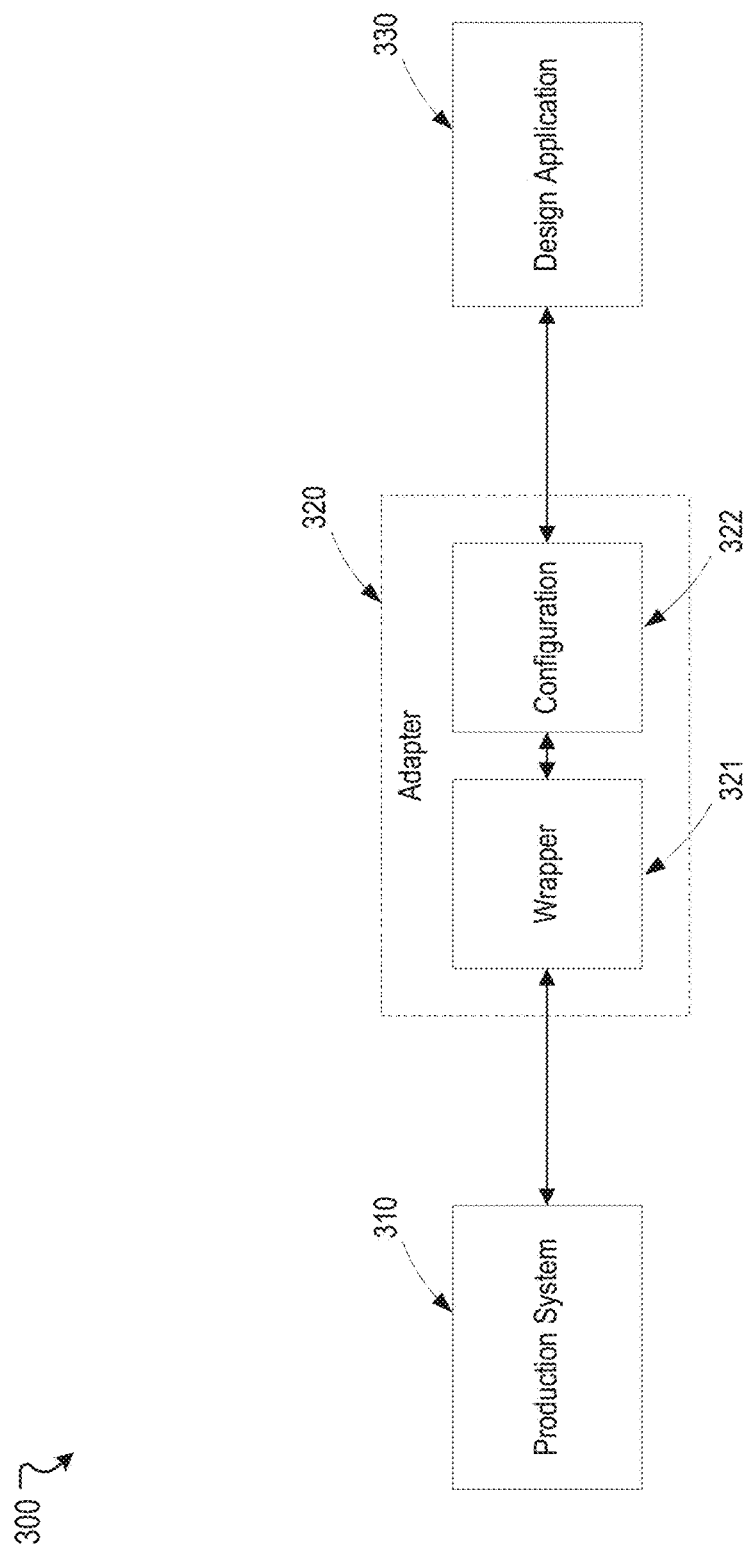
FIG. 3A illustrates an example scenario for generating user interface prototypes based on user interface components of a production system, according to an embodiment of the present disclosure.

FIG. 3A illustrates an example scenario 300 for generating user interface prototypes based on user interface components of a production system 310, according to an embodiment of the present disclosure. The production system 310 can provide one or more UI components for developing user interfaces. The UI components of the production system 310 can be adapted for use in the design application 330 and can be imported into the design application 330 through the adapter 320. The production system 310 and the design application 330 can be based on the same platform and/or system, such as a web infrastructure. In some embodiments, the design application 330 can be implemented on top of or based on the production system 310. Accordingly, UI components in the design application 330 can be created in the production system 310 and rendered by the production system 310. The adapter 320 can include a wrapper 321 and a configuration 322. The configuration 322 can map properties of UI components to GUI elements to be displayed in a user interface of the design application 330. A user can input a value for a property of a UI component in a corresponding GUI element displayed in the design application 330. The configuration 322 can set a value of the property of the UI component to the value input by the user. For example, the configuration 322 can pass the value input by the user to the UI component. If needed, the wrapper 321 can convert the value input by the user to a format compatible with a UI component prior to passing the value to the UI component. The production system 310 can render the UI component based on the value of the property.

Figure 3B:
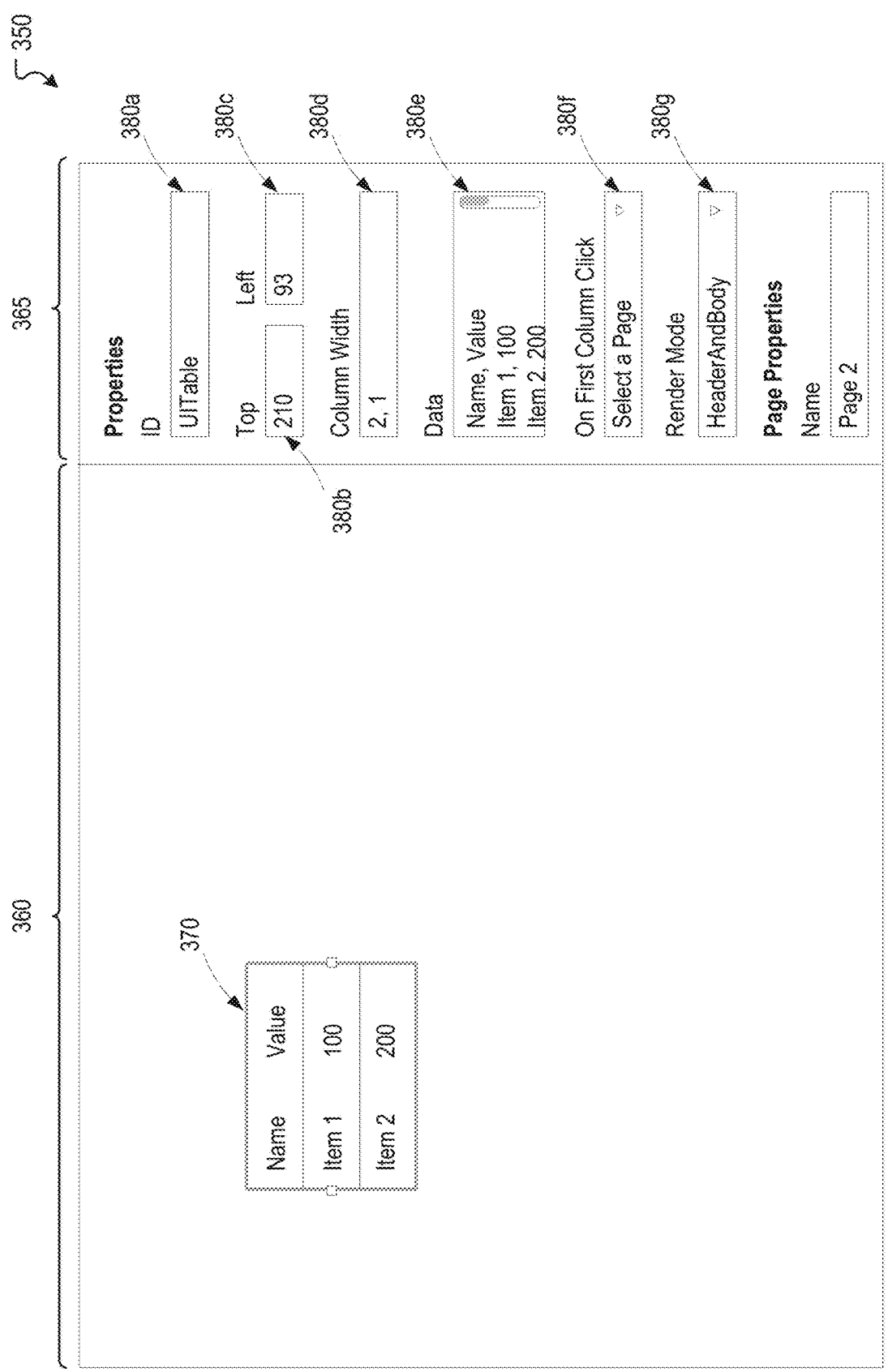
FIG. 3B illustrates an example scenario for generating user interface prototypes based on user interface components of a production system, according to an embodiment of the present disclosure.

FIG. 3B illustrates an example user interface 350 for generating user interface prototypes based on user interface components of a production system, according to an embodiment of the present disclosure. The user interface 350 illustrates a design mode of a design application. In the example of FIG. 3B, the user interface 350 includes a canvas 360 and a properties pane 365. A user can add a UI component 370 to the canvas 360. When the UI component 370 is added, values of properties of the UI component 370 can be provided in the properties pane 365. For example, the properties pane 365 can display default values associated with the properties of the UI component 370. The properties pane 365 displays GUI elements 380 that correspond to the properties of the UI component 370. In the example of FIG. 3B, the UI component 370 is a table, and the properties of the UI component 370 include an identifier, a top position, a left position, a column width, data, an action on first column selection, and a rendering mode. The properties pane 365 displays GUI elements 380 corresponding to the properties. The identifier property, the top position property, the left position property, the column width property, the data property, the action on first column selection property, and the rendering mode property are associated with GUI elements 380*a*, 380*b*, 380*c*, 380*d*, 380*e*, 380*f*, and 380*g*, respectively. The GUI elements 380*a*, 380*b*, 380*c*, 380*d* are text fields. User input entered in the GUI elements 380*a*, 380*b*, 380*c*, 380*d* can be obtained as a text or a number. The GUI element 380*e* is a text box. User input entered in the GUI element 380*e* can be text, and the text can be converted to a data structure that is compatible with the UI component 370. The GUI elements 380*f*, 380*g* are selectors. User input for the GUI elements 380*f*, 380*g* can be a selection of a value from available values.

FIG. 4 illustrates an example first method 400 for generating user interface prototypes based on user interface components of a production system, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can obtain a UI component of a production system, wherein the UI component is associated with one or more properties. At block 404, the example method 400 can map each of the one or more properties to a graphical user interface (GUI) element for display in a user interface of a design application. At block 406, the example method 400 can set a value of a property of the one or more properties based on user input from a GUI element associated with the property. At block 408, the example method 400 can present a rendering of the UI component in the user interface based on the set value of the property. Other suitable techniques that incorporate various features and embodiments of the present disclosure are possible.

Figure 5:
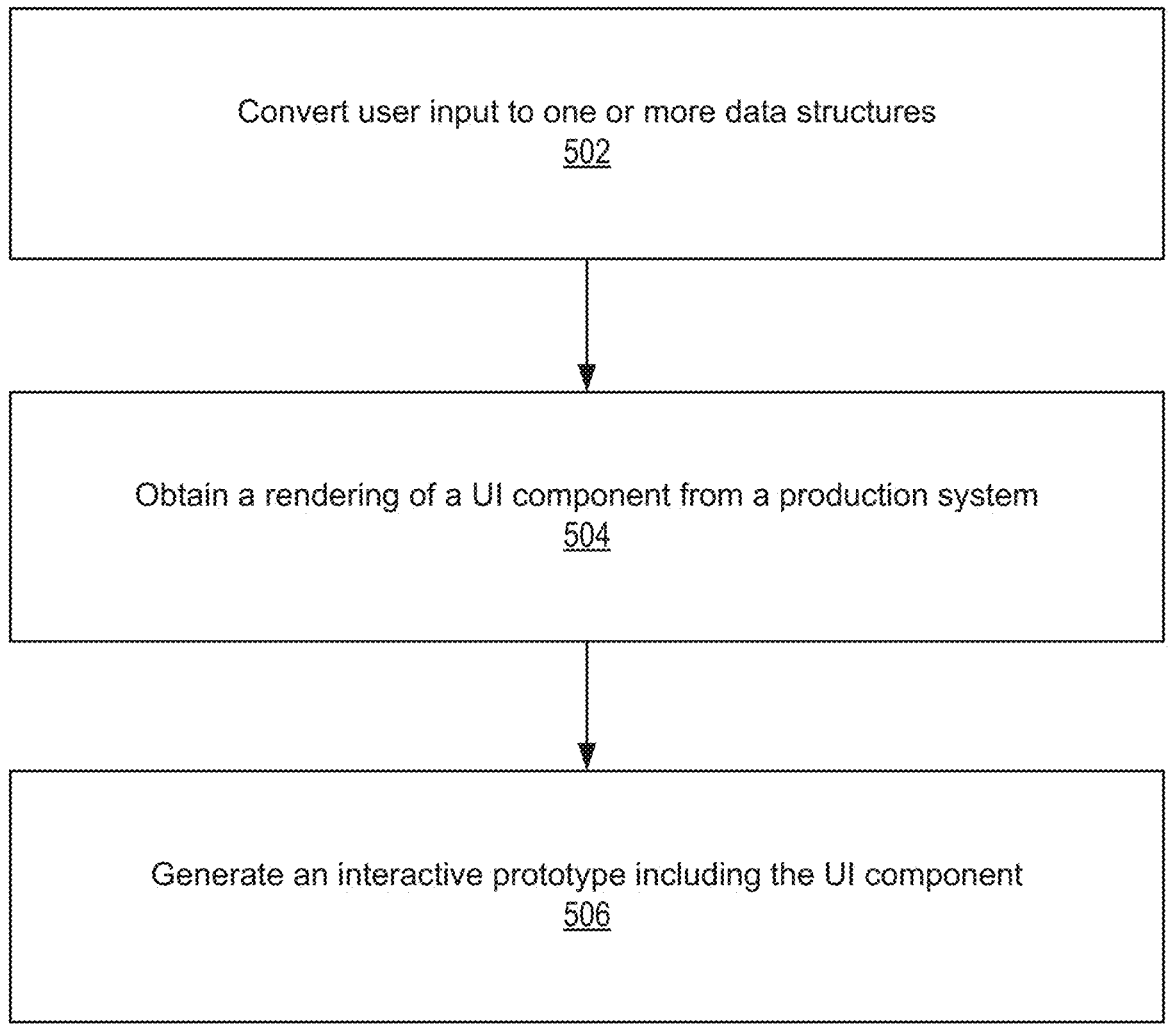
FIG. 5 illustrates an example second method for generating user interface prototypes based on user interface components of a production system, according to an embodiment of the present disclosure.

FIG. 5 illustrates an example second method 500 for generating user interface prototypes based on user interface components of a production system, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can convert user input to one or more data structures. The user input can be similar to the user input explained in connection with FIG. 4. At block 504, the example method 500 can obtain a rendering of a UI component from a production system. The UI component can be similar to the UI component explained in connection with FIG. 4. The rendering of the UI component can be similar to the rendering of the UI component explained in connection with FIG. 4. The production system can be similar to the production system explained in connection with FIG. 4. At block 506, the example method 500 can generate an interactive prototype including the UI component. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
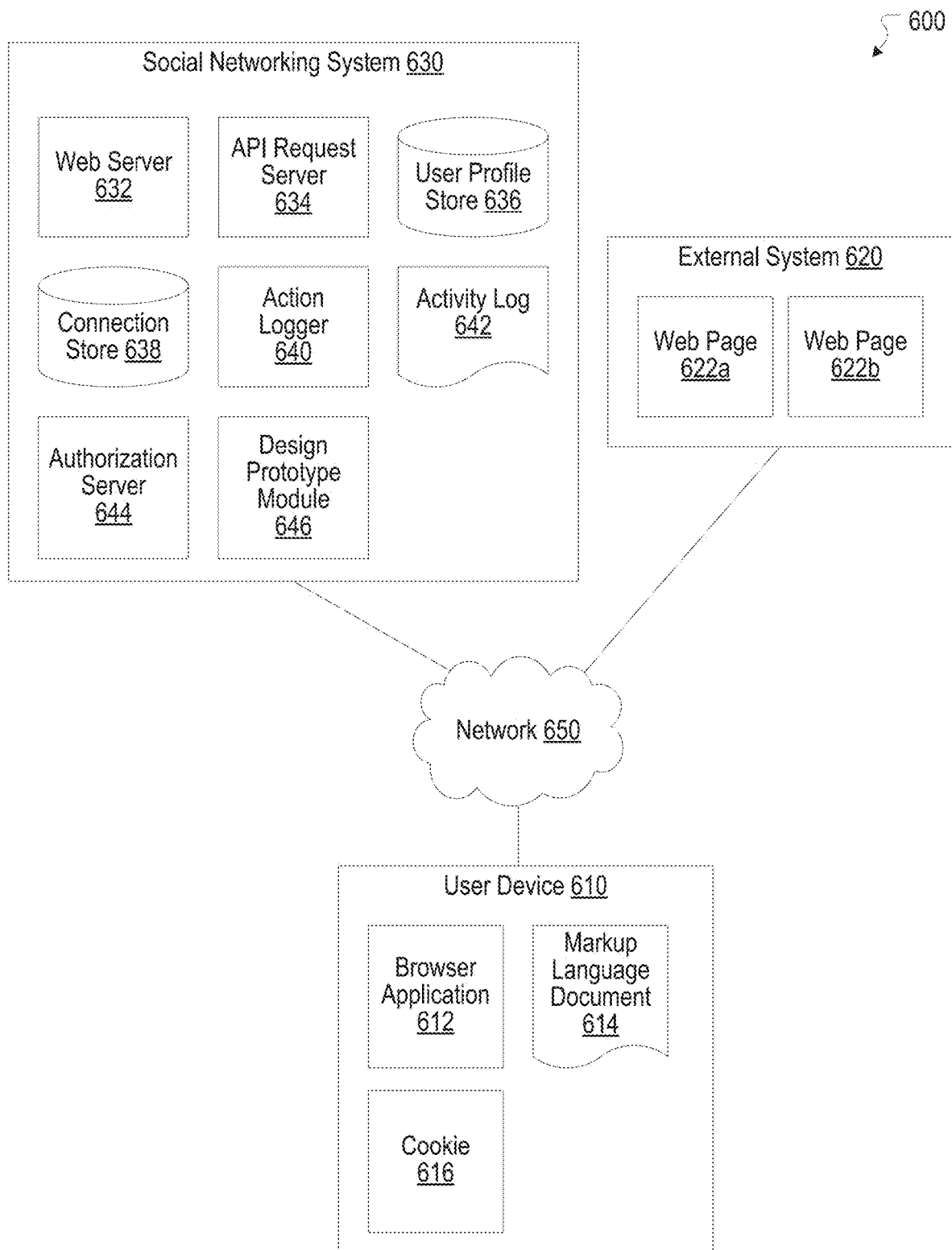
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a design prototype module 646. The design prototype module 646 can be implemented with the design prototype module 102, as discussed in more detail herein. In some embodiments, one or more functionalities of the design prototype module 646 can be implemented in the user device 610.

Hardware Implementation

Figure 7:
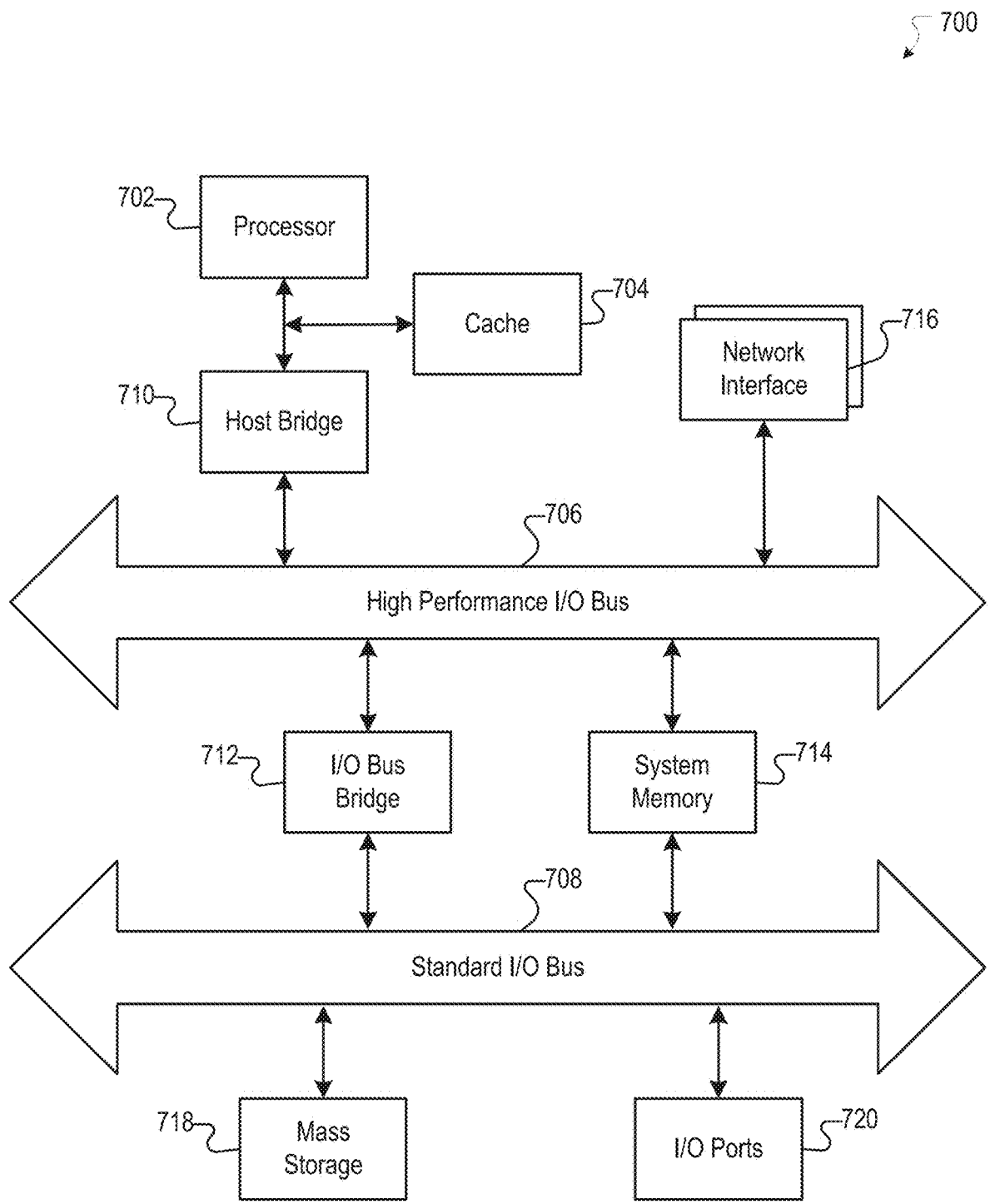
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, a user interface (UI) component of a production system to render the UI component in a user interface of a design application, wherein the UI component is associated with one or more properties, wherein values of the one or more properties are set with code;
    mapping, by the computing system, each of the one or more properties to a graphical user interface (GUI) element for display in the user interface of the design application, wherein the user interface leverages the UI component of the production system and maintains at least some behavior of the UI component in the design application, and wherein the one or more properties of the UI component of the production system are represented by corresponding GUI elements in the user interface of the design application;
    providing, by the computing system, a rendering of the UI component in the user interface of the design application based on the values of the one or more properties associated with the UI component of the production system, wherein the user interface includes a canvas and a properties pane, and wherein the production system and the design application are based on a same platform and the production system renders the UI component in the user interface of the design application;
    receiving, by the computing system, a user input for creating a new UI component in the canvas or editing, via the properties pane, at least one value of the one or more properties of the rendered UI component in the user interface of the design application without using code;
    converting, by the computing system, the user input received in the user interface of the design application to a data structure compatible with the UI component of the production system;
    determining, by the computing system, a linked property rendered in the user interface of the design application, the linked property indicative of code to be executed by the production system based on a change to the at least one value of the one or more properties in the design application;
    passing, by the computing system, the changed at least one value, converted to the data structure, of the one or more properties to update the UI component of the production system; and
    providing, by the computing system, a second rendering of the UI component in the user interface of the design application based on the at least one value and the linked property, wherein the production system renders the updated UI component in the user interface of the design application, and wherein the updated UI component of the production system and the rendered UI component in the user interface of the design application are maintained in sync.

2. The computer-implemented method of claim 1, wherein the rendering of the UI component is obtained from the production system.

3. The computer-implemented method of claim 1, wherein the UI component includes one or more of: a button, a table, a chart, a text field, a text box, a selector, or a navigation bar.

4. The computer-implemented method of claim 1, wherein the GUI element includes one or more of: a text field, a text box, or a selector.

5. The computer-implemented method of claim 1, further comprising associating a first property of the UI component with a second property of the UI component.

6. The computer-implemented method of claim 1, further comprising specifying for an action associated with the UI component one or more of: a page, an image, or data.

7. The computer-implemented method of claim 1, further comprising generating an interactive prototype including the UI component.

8. The computer-implemented method of claim 7, wherein the design application includes a design mode and a preview mode, and the interactive prototype is provided in the preview mode.

9. A system comprising:
    at least one hardware processor; and a memory storing instructions that, when executed by the at least one processor, cause the system to perform:

obtaining a user interface (UI) component of a production system to render the UI component in a user interface of a design application, wherein the UI component is associated with one or more properties, wherein values of the one or more properties are set with code;

mapping each of the one or more properties to a graphical user interface (GUI) element for display in the user interface of the design application, wherein the user interface leverages the UI component of the production system and maintains at least some behavior of the UI component in the design application, and wherein the one or more properties of the UI component of the production system are represented by corresponding GUI elements in the user interface of the design application;

providing a rendering of the UI component in the user interface of the design application based on at least one value of the property of the one or more properties associated with the UI component of the production system, wherein the user interface includes a canvas and a properties pane, and wherein the production system and the design application are based on a same platform and the production system renders the UI component in the user interface of the design application;

receiving a user input for creating a new UI component in the canvas or editing, via the properties pane, at least one value of the one or more properties of the rendered UI component in the user interface of the design application without using code;

converting the user input received in the user interface of the design application to a data structure compatible with the UI component of the production system;

determining a linked property rendered in the user interface of the design application, the linked property indicative of code to be executed by the production system based on a change to the at least one value of the one or more properties in the design application;

passing the changed at least one value, converted to the data structure, of the one or more properties to update the UI component of the production system; and providing a second rendering of the UI component in the user interface of the design application based on the at least one value and the linked property, wherein the production system renders the updated UI component in the user interface of the design application, and wherein the updated UI component of the production system and the rendered UI component in the user interface of the design application are maintained in sync.

10. The system of claim 9, wherein the rendering of the UI component is obtained from the production system.

11. The system of claim 9, wherein the instructions further cause the system to perform specifying for an action associated with the UI component one or more of: a page, an image, or data.

12. The system of claim 9, wherein the instructions further cause the system to perform generating an interactive prototype including the UI component.

13. A non-transitory computer readable medium including instructions that, when executed by at least one hardware processor of a computing system, cause the computing system to perform a method comprising:

obtaining a user interface (UI) component of a production system to render the UI component in a user interface of a design application, wherein the UI component is associated with one or more properties, wherein values of the one or more properties are set with code;

mapping each of the one or more properties to a graphical user interface (GUI) element for display in the user interface of the design application, wherein the user interface leverages the UI component of the production system and maintains at least some behavior of the UI component in the design application, and wherein the one or more properties of the UI component of the production system are represented by corresponding GUI elements in the user interface of the design application;

providing a rendering of the UI component in the user interface of the design application based on at least one value of the property of the one or more properties associated with the UI component of the production system, wherein the user interface includes a canvas and a properties pane, and wherein the production system and the design application are based on a same platform and the production system renders the UI component in the user interface of the design application;

receiving a user input for creating a new UI component in the canvas or editing, via the properties pane, at least one value of the one or more properties of the rendered UI component in the user interface of the design application without using code;

converting the user input received in the user interface of the design application to a data structure compatible with the UI component of the production system;

determining a linked property rendered in the user interface of the design application, the linked property indicative of code to be executed by the production system based on a change to the at least one value of the one or more properties in the design application;

passing the changed at least one value, converted to the data structure, of the one or more properties to update the UI component of the production system; and providing a second rendering of the UI component in the user interface of the design application based on the at least one value and the linked property, wherein the production system renders the updated UI component in the user interface of the design application, and wherein the updated UI component of the production system and the rendered UI component in the user interface of the design application are maintained in sync.

14. The non-transitory computer readable medium of claim 13, wherein the rendering of the UI component is obtained from the production system.

15. The non-transitory computer readable medium of claim 13, wherein the method further comprises specifying for an action associated with the UI component one or more of: a page, an image, or data.

16. The non-transitory computer readable medium of claim 13, wherein the method further comprises generating an interactive prototype including the UI component.

* * * * *